May 31, 1949. E. E. GARRETT ET AL 2,471,522
PHOTOGRAPHIC FILM HOLDER
Filed Sept. 20, 1947 2 Sheets-Sheet 1

INVENTORS
Elmer E. Garrett
Robert C. Steck
and
BY Alexander T. Gassovsky
Donald L. Brown
Attorney

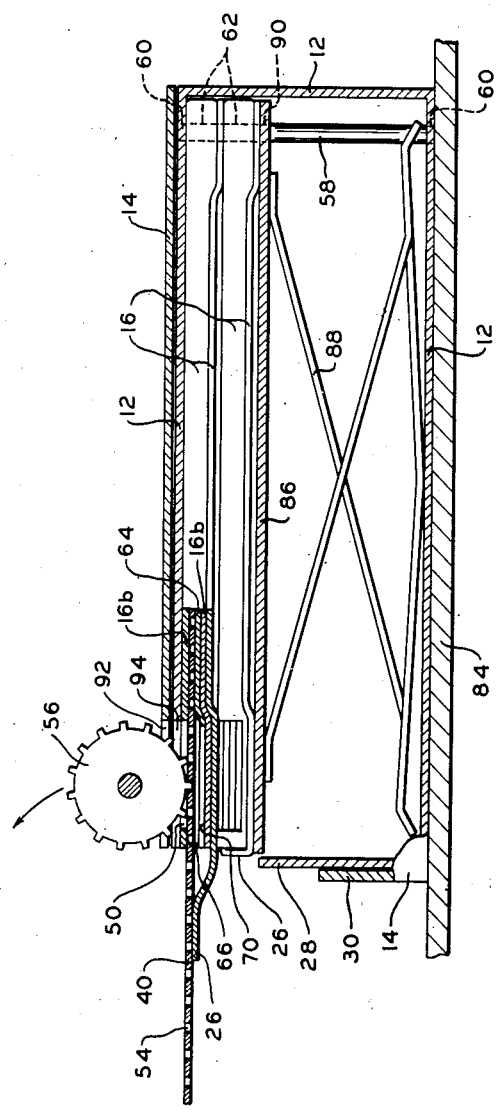

Patented May 31, 1949

2,471,522

UNITED STATES PATENT OFFICE 2,471,522

PHOTOGRAPHIC FILM HOLDER

Elmer E. Garrett, Freeport, Robert C. Steck, Mount Vernon, and Alexander T. Yasensky, Jamaica, N. Y., assignors to Polaroid Corporation, Cambridge, Mass., a corporation of Delaware Application September 20, 1947, Serial No. 775,365

15 Claims. (Cl. 95—66)

This invention relates to photography and more particularly to novel photographic products.

An object of the invention is to provide a package or assembly of photographic film and other materials wherein an opaque covering sheet may be slidably removed from the film for photographic exposure thereof and wherein said sheet may be returned to a position covering the film after its exposure.

Another object of the invention is to provide an assembly of the aforementioned type so constructed as to releasably hold other materials thereof stationary in the focal plane of a camera during displacement of the covering sheet.

A further object of the invention is to provide an assembly of the aforesaid type so constructed as to permit displacement of the entire assembly from the focal plane after return of the covering sheet.

Still another object of the invention is to provide an assembly of the aforementioned type comprising a processing fluid contained for release between leading portions of the film and covering sheet.

A still further object of the invention is to provide an assembly of the character described wherein, after exposure of the film and return of the covering sheet and during progressive subjection of the assembly to pressure applying means, the fluid may be released from its container and spread between the film and covering sheet for processing an exposed area of the film.

Still another object of the invention is to provide an assembly of the aforementioned type wherein the covering layer, when subjected to the processing fluid and compressed with the film, is adapted to carry a positive print of the subject image to which the film is exposed.

A still further object of the invention is to provide a plurality of units of the aforementioned type in the form of a film pack comprising suitable enclosing or magazine means and adapted to loading in the magazine holder of a camera.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 4:
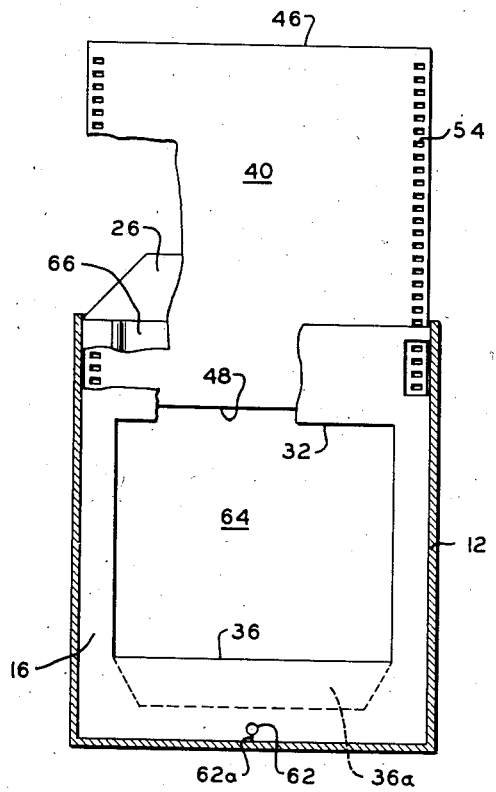

Fig. 4 is a schematic top plan view of the assembly, with parts broken away and showing the covering sheet withdrawn from the film; and Fig. 5 is a somewhat schematic elevational view, partly in cross section, showing a plurality of assembly units constituting a form of film pack, enclosed in a suitable magazine, the elements being shown in relation to portions of a camera and movable parts of an assembly being shown at a stage of their movement.

The novel assembly of the invention comprises an envelope of novel construction containing a sheet of photographic film, a fluid container releasably holding a processing fluid, and a sheet or panel of opaque material normally covering the film and slidably displaceable therefrom for exposure of the film. The entire unit is adapted to loading in a camera wherein are incorporated suitable mechanical means for removal of the covering sheet from an exposable photosensitive area of film, conventional means for direct exposure of said photosensitive area, means for return of the covering sheet after said exposure, and means for progressively applying compression to the entire assembly whereby the film and covering sheet are compressed and the fluid is released and spread therebetween at least throughout an area coextensive with the exposed area of film. The aforesaid operations, taken in conjunction with suitable film, processing fluid, and covering or receiving sheet, and a suitable relative assembly thereof in said envelope provide formation of a positive print of the subject image of said exposure upon and/or within one of said materials, said print being visible when the film and covering sheet are stripped apart as, for example, after removal of the unit from the camera.

Figure 1:
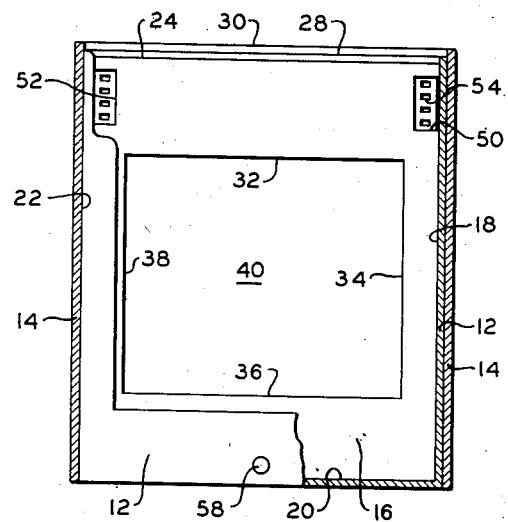
Figure 1 is a schematic top plan view of the assembly, with parts broken away.

Referring to Fig. 1 there is shown a top plan view of the novel assembly or package of photographic materials of the invention mounted in a casing or magazine 12 which, in turn, is mounted in a magazine holder 14. It may be assumed that magazine holder 14 is incorporated with a camera (not shown) and that the assembly is viewed from a position such as that occupied by the exposure aperture of the camera, a light sensitive film material within the assembly thus being positioned substantially in the focal plane. Portions of the assembly shown in Fig. 1 comprise an envelope 16 formed, for example, of an opaque paper, having folded edge portions 18, 20, and 22, and cut edge portions 24, said last-named portions being unbonded to one another and permitting entrance or withdrawal of materials therebetween. One of said cut edge portions 24 is of an extended length and comprises a flap 26 (Fig. 2), said flap being a prolongation of the under wall of the envelope and being invisible in Fig. 1 because it is folded within the assembly. Thus, the envelope is so constructed as to comprise three folded or, alternatively, sealed edges and a fourth edge comprising two unsealed portions, any construction providing an envelope of the aforesaid characteristics being substantially suitable for the purpose. It is to be noted that wall portions 28 and 30 (Figs. 1 and 5) of the magazine and magazine holder, respectively, are of diminished height relative to other wall portions, thus permitting slidable movement of a material of the assembly through open edges 24 of the envelope and through apertures formed in the magazine and magazine holder by said reduced height of wall portions 28 and 30. The frontal surface of the envelope, namely, that surface which faces the lens of the camera when mounted therein, comprises a cutout area or aperture for exposure of film contained in the envelope, said area being defined by edges 32, 34, 36, and 38 forming a frame which determines the shape and extent of the exposed area of said film. A sheet of material 40, as for example a substantially rigid, cardlike sheet preferably having an underlying surface adapted to carry a positive photographic print, is slidably mounted within the envelope, said sheet preferably having the relative dimensions shown in Fig. 2. It will be noted in Fig. 2 that side edges 42 and 44 of said film covering sheet are adjacent folds 18 and 22 of the envelope, said folds providing grooves for slidable movement of said sheet 40, that leading edge 46 thereof is substantially flush with one of cut edges 24 of the envelope, said flap 26, which constitutes the other of said cut edges, being folded over the leading edge of the covering sheet, and that trailing edge 48 of the covering sheet is positioned under a portion of the envelope so as to be slightly spaced from aperture edge 36 thereof. Again referring to Fig. 1, a pair of slots 50 and 52 are provided in the envelope adjacent folds 18 and 22 thereof, said slots being adapted to receive propulsive means as, for example, friction rollers or sprockets incorporated with a camera, for engaging and slidably moving covering sheet 40. Said propulsive means may suitably comprise a pair of sprockets and, as shown, the covering sheet is adapted to engagement therewith, sprocket holes 54 being provided along marginal portions of sheet 40 for the purpose. In Fig. 5, one of a pair of sprockets 56 is shown in functional engagement with sprocket holes 54 of the film covering or image receiving sheet. A pin 58 (Figs. 1 and 5) is provided for releasably holding the envelope stationary during displacement of the covering sheet, said pin passing respectively through perforations 60 in upper and under portions of the magazine (Fig. 5) and through perforations 62 comprising separable slots 62a in upper and under portions of the envelope (Figs. 2, 3, 4, and 5).

Figure 2:
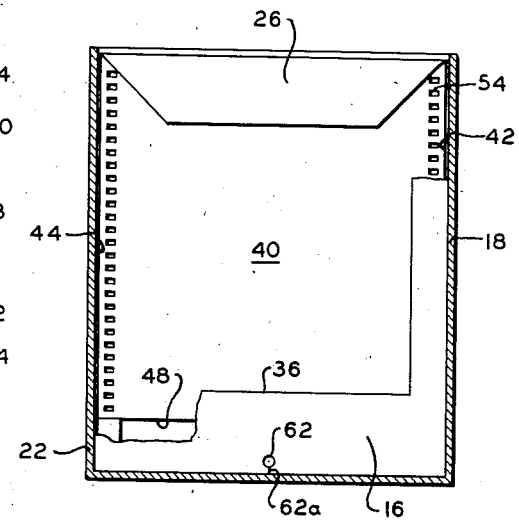
Fig. 2 is a schematic top plan view of the assembly, with parts further broken away.

In Fig. 2, parts of the magazine and upper wall of the envelope have been broken away to show covering sheet 40 in greater detail. Flap 26 is shown folded over said covering sheet, it being understood that the flap is thus positioned in Fig. 1, although underlying the upper wall of the envelope and thus not visible.

Figure 3:
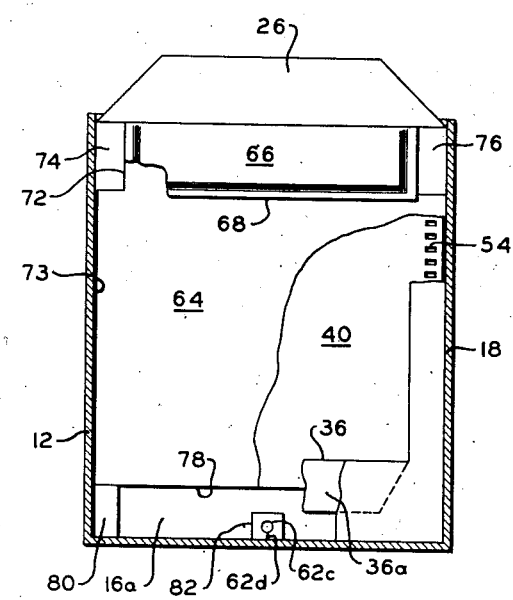
Fig. 3 is a schematic top plan view of the assembly, with parts broken away to a further extent than in Figs. 1 and 2 and showing a flap element extending from the assembly.

Fig. 3 shows constructions underlying covering sheet 40, which is largely broken away for the purpose. A photographic film 64 is shown, the photosensitive emulsion being toward the viewer. Flap 26 is hinged or unfolded outwardly to the position which it would assume when actuated by covering sheet 40 during slidable movement of the latter as it is withdrawn from the envelope. A fluid container 66 releasably holding a supply of film processing fluid is mounted adjacent leading portions of film 64, in advance of the exposable area thereof, said container, when progressively subjected to compression in a direction from leading to trailing portions thereof, being adapted to release its fluid contents along separable or frangible edge portions 68. As previously stated, the exposed area of film is defined by the cutout portion of the envelope shown in Fig. 1, the fluid container is mounted exteriorly of and adjacent said area, and it will be understood that at least sufficient fluid for release and spreading thereof throughout said area is provided.

Film 64 comprises at least an underlying area or base portion which is attached or bonded to the envelope to prevent removal of the film therefrom as by frictional contact with the covering layer during the aforesaid displacement of the latter, bonding of the film and envelope being indicated at portions 70 (Fig. 5). Referring again to Fig. 3, leading film portions 72 are indented to provide a lesser width thereof than succeeding portions 73 which extend laterally to the folds of the envelope, said reduced portions resulting in the provision of spaces 74 and 76 between the covering sheet and the under wall of the envelope. It will be noted that said spaces underlie the point of contact of sprocket 56 with marginal sprocket holes 54 of covering sheet 40 and thus permit possible penetration of sprocket teeth beyond said sprocket holes without contacting the film, thus preventing undesired application of propulsive force to the film. As previously described, the envelope is releasably held in the magazine by pin 58 and it is to be understood that frictional contact of the covering sheet and film, during movement of the former, may be extremely light and, in any case, insufficient to effect spreading of perforation 62a and release of the envelope, said release being accomplished at a further stage of operation by other means to be described.

Trailing edge 78 of the film preferably underlies trailing edge 48 of the covering sheet, said edge 78 abutting a pair of limit stops, one of said stops 80 being shown. Said limit stops 80 also serve as spacers between the envelope walls and, for example, may be composed of a relatively non-compressible material such as cardboard, said limit stops being bonded to under surface 16a of the envelope. Limit stops 80 are preferably of a thickness substantially equal to the combined thickness of the film and covering sheet, their limit stop function being that of establishing the position of maximum insertion of said covering sheet in the envelope and their spacing function being that of providing a space between portions of the envelope walls for a purpose to be described. Edge 36 of the envelope is shown as formed by a folded portion 36a, said fold providing edge 36 in somewhat rounded form for substantially unobstructed return of covering sheet 40 thereunder. The aforesaid space between area 16a of the under wall of the envelope and the upper wall of said envelope provides a trapping or confining area for any of the film processing fluid in excess of that retained between the film and covering sheet which may be passed thereinto under influence of the aforesaid compression of the assembly. An area surrounding perforation 62 may preferably comprise an eyelet-like member 82 formed of cardboard or the like and bonded to envelope portion 16a, said member having a thickness substantially equal to that of limit stops or spacers 80. Said elements 80 are adapted to withstand a force of compression such as that to which the assembly is to be subjected. Accordingly, said elements 80 are adapted to prevent compression of said fluid trapping area adjacent wall 16a of the envelope, whereby an enclosure or pocket is maintained for holding said excess of fluid. Eyelet member 82, which is preferably bonded to both envelope walls, comprises perforated portions 62c and 62d and provides means surrounding the aforesaid perforations in the envelope for preventing escape of the excess fluid through said perforations. It will be understood that perforated portions 62c and 62d serve a function relative to pin 58 which is similar to perforated portions 62 and 62a of the envelope per se.

In Fig. 4, slidable withdrawal of covering sheet 40, to an extent suitable for photographic exposure of film 64, is illustrated. It will be noted that trailing edge 48 of covering sheet 40 has passed slightly beyond edge 32 of the envelope aperture and that envelope flap 26 has been unfolded, through contact of leading edge 46 of the moving covering sheet therewith, said flap 26 extending longitudinally of the assembly, adjacent under portions of sheet 40.

Fig. 5 shows, in elevation and partially in cross section, a plurality of the assemblies or packages of the invention loaded in a suitable magazine 12, the magazine, in turn, being inserted in magazine holder 14 of a camera, casing portion 84 of the camera being shown. Magazine 12, in which, for example, the assemblies may be supplied as a "film pack," comprises suitable side, upper, and lower wall portions, the upper wall being suitably cut away, as shown in Fig. 1, so as not to encroach upon the envelope aperture, and the forward wall 28 being of a length to permit the aforesaid unobstructed slidable movement of the covering sheet from the magazine. The magazine, as shown in Fig. 5, comprises a pressure plate 86 and a compression spring 88, said elements performing the usual function of biasing the contents of the magazine toward release position. The pressure plate comprises a suitable perforation or cut-away portion 90 for slidable passage of pin 58 therethrough. As shown in Fig. 5, it is to be assumed that sprocket 56 is rotatable in a clockwise direction for removing covering sheet 40, said sprocket also being rotatable in a counterclockwise direction for returning said sheet. It should be understood that the sprocket is operationally movable to and from engagement with covering sheet 40, whereby it may be removed therefrom after return of said sheet to permit unimpeded movement of the assembly by other means. Upper walls of the magazine holder and magazine, respectively, comprise indented portions 92 and 94 permitting entrance of sprocket 56 to sprocket holes 54 of said covering sheet, the upper envelope wall 16b incorporating apertures 50 and 52 for a similar purpose, as previously described. In the underlying assembly of the two assemblies shown in Fig. 5, flap 26 is shown in its normal position, folded within the envelope. In the upper positioned assembly, said flap is shown as having been unfolded by withdrawal of covering sheet 40. Extending flap 26 comprises means for withdrawal of the entire assembly from the magazine, after operations comprising removal of covering sheet 40, exposure of film 64, and return of said covering sheet 40, said flap being adapted to insertion between advancing means as, for example, pressure rollers (not shown) embodied in a camera. During said operations of removing covering sheet 40 and thereby positioning flap 26 as shown, it is to be understood that the aforesaid pressure rollers are separated sufficiently to permit unimpeded passage of said covering sheet and flap therebetween. Flap 26 remains between the pressure rollers when covering sheet 40 is returned to the envelope. When, subsequently, the rollers are brought together and rotated, flap 26 serves as a leader for drawing the envelope and contents between said rollers. It may be assumed that the pressure rollers per se or suitable pressure applying elements, mounted between the pressure rollers and the magazine, are utilized for performing the aforesaid operations of compressing the assembly and releasing and spreading the processing fluid between film 64 and covering sheet 40.

Various modifications of the assembly are possible wherein alternative constructions may be employed. One such modification contemplates a covering sheet having semiperforations therein defining an area comprising the area of the photographic image, which after establishment of the fluid layer between the materials and processing of the film, may be separated from other portions of said sheet and lifted from its bonded relation with the film, for viewing the completed photographic print. Edge 48 of the covering sheet may appropriately be formed as a convex edge or a modified "V" rather than the linear edge shown, thus providing edge portions more readily passed under envelope edge 36 during return of the covering sheet. Various other fluid trapping constructions may be employed as, for example, the incorporation of fluid absorptive material within area 16a. It will be apparent that the fluid container could be mounted directly upon the underlying wall of the envelope, thus enabling employment of a lesser length of film than that shown. A further modification would provide the covering sheet normally removed from the film, permitting exposure thereof. After exposure of the film, the covering sheet and film would be moved so that one lies upon the other and the assembly would then be compressed. In said modification it will be understood that the assembly pack would be provided in a removable light-tight package or loaded in a dark room.

The processing fluid of the invention is preferably viscous and of a film-forming type. When the fluid is spread between the film material and covering sheet, it is adapted both to process the light-sensitive film emulsion and to form, of itself, a substantially stable plastic layer, predeterminedly adhering to each of the materials throughout the areas of coverage. The fluid preferably contains suitable photographic reagents for processing the film emulsion or, alternatively, may serve to dissolve such reagents contained in the sheet materials. Processing of the film may comprise development of the photosensitive emulsion or development and fixing thereof. A preferred process, however, involves the transfer of image-forming components from the exposed film emulsion to the aforesaid plastic layer to provide a positive image upon or within said layer and/or upon or within the covering sheet supporting said layer.

A preferred processing fluid for carrying out the foregoing process comprises as ingredients thereof a solvent such as water, a developer such as hydroquinone, a film-forming material such as sodium carboxymethyl cellulose, a silver halide solvent such as sodium thiosulfate, and an alkali such as sodium hydroxide.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. An assembly of materials adapted to direct photographic exposure of a film embodied therein and to processing of said film by subjection of the assembly to compression, said assembly comprising, in combination, a photographic film, an opaque sheet normally covering the light-sensitive surface of said film and adapted to displacement therefrom, a processing fluid contained for release between adjacent portions of said film surface and opaque sheet, and an envelope substantially enclosing the aforesaid materials, said envelope comprising an aperture normally closed by said opaque sheet and adapted to admit actinic light to said film surface when said sheet is displaced therefrom, said envelope also comprising an opening through which said opaque sheet may pass during said displacement thereof, said envelope being so formed as to leave uncovered a portion of said sheet when said sheet is in said envelope and is covering said light-sensitive surface so that said sheet is accessible for engagement by mechanical means for effecting slidable movement of said sheet relative to said film surface.

2. An assembly of materials adapted to direct photographic exposure of a film embodied therein and to processing of said film by subjection of the assembly to compression, said assembly comprising, in combination, a photographic film, an opaque sheet normally covering the light-sensitive surface of said film and adapted to displacement therefrom, a processing fluid contained for release between adjacent portions of said film surface and opaque sheet, and an envelope substantially enclosing the aforesaid materials, said envelope comprising an aperture normally closed by said opaque sheet and adapted to admit actinic light to said film surface when said sheet is displaced therefrom, said envelope also comprising an opening through which said opaque sheet may pass during said displacement thereof, at least an aperture permitting engagement of said opaque covering sheet by mechanical means for effecting slidable movement of said sheet relative to said film surface, and a hinged flap-like element adapted to positioning adjacent mechanical propulsion means spaced from said assembly, said flap-like element being adapted to frictional engagement with said propulsion means and thereby enabling advancement of the entire assembly between surfaces suitable for progressively compressing said assembly.

3. An assembly of materials adapted to direct photographic exposure of a film embodied therein and to processing of said film by subjection of the assembly to compression, said assembly comprising, in combination, a photographic film, an opaque sheet normally covering the light-sensitive surface of said film and adapted to displacement therefrom, a processing fluid contained for release between adjacent portions of said film surface and opaque sheet, and an envelope substantially enclosing the aforesaid materials, said envelope comprising an aperture normally closed by said opaque sheet and adapted to admit actinic light to said film surface when said sheet is displaced therefrom, said envelope also comprising an opening through which said opaque sheet may pass during said displacement thereof, at least an aperture permitting engagement of said opaque covering sheet by mechanical means for effecting slidable movement of said sheet relative to said film surface, and a hinged flap normally folded over an extremity of said covering sheet within the envelope, said flap being caused to extend outwardly from the envelope, during movement of said covering sheet, to a position adjacent mechanical propulsion means spaced from said assembly, said flap being adapted to frictional engagement with said propulsion means and thereby enabling advancement of the entire assembly between surfaces suitable for progressively compressing said assembly.

4. An assembly of materials adapted to direct photographic exposure of a film embodied therein and to processing of said film by subjection of the assembly to compression, said assembly comprising, in combination, a photographic film, an opaque sheet normally covering the light-sensitive surface of said film and adapted to slidable displacement for exposure of said film and replacement after said exposure, a processing fluid contained for release between adjacent portions of said film surface and opaque sheet, an envelope substantially enclosing the aforesaid materials, means associated with the envelope for holding said envelope stationary during displacement of said opaque covering sheet, the aforesaid envelope comprising an aperture normally closed by said opaque sheet and adapted to admit actinic light to said film surface when said sheet is displaced therefrom, said envelope also comprising an opening through which said opaque sheet may pass during displacement and replacement thereof, and at least an aperture permitting engagement of said opaque covering sheet by mechanical means for effecting slidable movement of said sheet relative to said film surface.

5. An assembly of materials adapted to direct photographic exposure of a film embodied therein and to processing of said film by subjection of the assembly to compression, said assembly comprising, in combination, a photographic film, an opaque sheet normally covering the light-sensitive surface of said film and adapted to slidable displacement for exposure of said film and replacement after said exposure, a processing fluid contained for release between adjacent portions of said film surface and opaque sheet, an envelope substantially enclosing the aforesaid materials, means for holding the envelope stationary during displacement of said opaque covering sheet, said last-named means comprising a plurality of separable perforations formed in the envelope and adapted to receive a holding pin, the aforesaid envelope comprising an aperture normally closed by said opaque sheet and adapted to admit actinic light to said film surface when said sheet is displaced therefrom, said envelope also comprising an opening through which said opaque sheet may pass during displacement and replacement thereof, and at least an aperture permitting engagement of said opaque covering sheet by mechanical means for effecting slidable movement of said sheet relative to said film surface.

6. An assembly of materials adapted to direct photographic exposure of a film embodied therein and to processing of said film by subjection of the assembly to compression, said assembly comprising, in combination, a photographic film, an opaque sheet normally covering the light-sensitive surface of said film and having marginal portions suitably formed for engaging mechanical means adapted to slidable displacement of said opaque sheet for exposure of said film surface, a processing fluid contained for release between adjacent portions of said film surface and opaque sheet, and an envelope substantially enclosing the aforesaid materials, said envelope comprising an aperture normally closed by said opaque sheet and adapted to admit actinic light to said film surface when said sheet is displaced therefrom, said envelope also comprising an opening through which said opaque sheet may pass during said displacement thereof, and at least an aperture permitting engagement of said marginal portions of the opaque covering sheet by said mechanical means.

7. An assembly of materials adapted to direct photographic exposure of a film embodied therein and to processing of said film by subjection of the assembly to compression, said assembly comprising, in combination, a photographic film, an opaque sheet normally covering the light-sensitive surface of said film and having sprocket holes extending along at least a marginal portion thereof, said sprocket holes, when engaged with a sprocket, enabling slidable displacement of said opaque sheet for exposure of said film surface and return of said sheet thereafter, a processing fluid contained for release between adjacent portions of said film surface and opaque sheet, and an envelope substantially enclosing the aforesaid materials, said envelope comprising an aperture normally closed by said opaque sheet and adapted to admit actinic light to said film surface when said sheet is displaced therefrom, said envelope also comprising an opening through which said opaque sheet may pass during said displacement thereof, and at least an aperture permitting engagement of said sprocket holes of the opaque covering sheet by said sprocket.

8. An assembly of materials adapted to direct photographic exposure of a film embodied therein and to processing of said film by subjection of the assembly to compression, said assembly comprising, in combination, a photographic film, an opaque sheet normally covering the light-sensitive surface of said film and having sprocket holes extending along at least a marginal portion thereof, said sprocket holes, when engaged with a sprocket, enabling slidable displacement of said opaque sheet for exposure of said film surface and return of said sheet thereafter, a processing fluid contained for release between adjacent portions of said film surface and opaque sheet, and an envelope substantially enclosing the aforesaid materials, said envelope comprising an aperture normally closed by said opaque sheet and adapted to admit actinic light to said film surface when said sheet is displaced therefrom, said envelope also comprising an opening through which said opaque sheet may pass during said displacement thereof, and at least an aperture permitting engagement of said sprocket holes of the opaque covering sheet by said sprocket, the aforesaid film having an excised portion underlying said last-named aperture whereby the teeth of a sprocket may penetrate beyond the depth of said sprocket holes and yet apply propulsive force only to said opaque covering sheet.

9. An assembly of materials adapted to direct exposure of a film embodied therein and to processing of said film by subjection of successive areas of the assembly to compression, said assembly comprising, in combination, a photographic film, an opaque sheet normally covering the light-sensitive surface of said film and adapted to displacement therefrom for exposing said surface, a processing fluid contained for release between adjacent portions of said film surface and opaque sheet and adapted to spreading therebetween during compression of the assembly, and an envelope substantially enclosing the aforesaid materials, said envelope having an aperture for admitting actinic light to the film when said opaque sheet is removed and comprising an enclosure adapted to confine any of said fluid in excess of that required for coverage of compressed areas of the film surface and covering sheet, namely, that portion of fluid which may be caused to flow beyond said areas through compression thereof, said envelope also comprising an opening through which said opaque sheet may pass during said displacement thereof, and at least an aperture permitting engagement of said opaque covering sheet by mechanical means for effecting slidable movement of said sheet relative to said film surface.

10. An assembly of materials adapted to direct exposure of a film embodied therein and to processing of said film by subjection of successive areas of the assembly to compression, said assembly comprising, in combination, a photographic film, an opaque sheet normally covering the light-sensitive surface of said film and adapted to displacement therefrom for exposing said surface, a processing fluid contained for release between portions of said film surface and opaque sheet and adapted to spreading therebetween during compression of the assembly, and a rectangular envelope substantially enclosing the aforesaid materials, one end of the envelope being unsealed and comprising a hinged flap, a surface of the envelope comprising an aperture for admitting actinic light to the film when said opaque sheet is removed through the open end of the envelope, said envelope also comprising at least an opening permitting engagement of the opaque covering sheet by mechanical means for effecting slidable movement thereof, the aforesaid film and covering sheet being positioned with their forward edges substantially flush with said open end of the envelope, their side edges adjacent side portions of the envelope, and their rear edges spaced from the rearward end of the envelope, said envelope having a portion bonded to the film for retaining said film therein, and said fluid being releasably contained adjacent said forward edges of the film and covering sheet.

11. A self-contained assembly of materials adapted to photographic exposure of a film embodied therein and to processing of said film and formation of a positive print of the subject image of said exposure upon one of the materials of said assembly through subjection of the assembly to compression, said assembly comprising, in combination, a rectangular envelope of preferably opaque paper material comprising a rear wall, and a frontal wall comprising an aperture for admittance of actinic light and at least another aperture permitting the entrance of sheet advancing mechanism therewithin, each of said walls having a separable perforation formed therein adapted to receive a pin for releasably holding said envelope stationary, said perforation being adapted to separate and permit release of said pin therefrom in response to a predetermined force applied to said envelope, one end of said envelope comprising a flap normally folded within the envelope and adapted to unfolding therefrom, said flap when unfolded providing an opening in said end of the envelope for removal of material therefrom.

12. A self-contained assembly of materials adapted to photographic exposure of a film embodied therein and to processing of said film and formation of a positive print of the subject image of said exposure upon one of the materials of said assembly through subjection of the assembly to compression, said assembly comprising, in combination, a rectangular envelope of preferably opaque paper material comprising a rear wall, and a frontal wall comprising an aperture for admittance of actinic light and at least another aperture permitting the entrance of sheet advancing mechanism therewithin, each of said walls having a separable perforation formed therein adapted to receive a pin for releasably holding said envelope stationary, said perforation being adapted to separate and permit release of said pin therefrom in response to a predetermined force applied to said envelope, one end of said envelope comprising a flap normally folded within the envelope and adapted to unfolding therefrom, said flap when unfolded providing an opening in said end of the envelope for removal of material therefrom, said envelope containing a sheet of photographic film, the base layer thereof being attached to said rear wall, the light-sensitive surface thereof facing said aperture in the frontal wall, and said film occupying an area at least coextensive with the area of said light admitting aperture but less than the area of the envelope, said envelope also containing a fluid releasably confined in a sac-like element fixedly mounted in the envelope at a position beside the exposable area of film, said sac-like element being responsive to compression for releasing said fluid to said film area after exposure thereof, said envelope further containing an opaque panel overlying said exposable film surface, the surface of said panel, facing said film, being adapted to formation of a positive print thereupon, said panel having a plurality of sprocket holes extending along at least a marginal portion thereof, said sprocket holes when engaged with the aforesaid sheet advancing mechanism enabling slidable displacement of the panel for exposure of the film surface and return of the panel to original position after said exposure, said assembly thereupon being adapted to compression for releasing and spreading said fluid, releasably bonding said film and panel, and forming said positive print.

13. A self-contained assembly of materials adapted to photographic exposure of a film embodied therein and to processing of said film and formation of a positive print of the subject image of said exposure upon one of the materials of said assembly through subjection of the assembly to compression, said assembly comprising, in combination, a rectangular envelope of preferably opaque paper material comprising a rear wall, a frontal wall comprising an aperture for admittance of actinic light and at least another aperture permitting the entrance of sheet advancing mechanism therewithin, each of said walls having a separable perforation formed therein adapted to receive a pin for releasably holding said envelope stationary, said perforation being adapted to separate and permit release of said pin therefrom in response to a predetermined force applied to said envelope, one end of said envelope comprising a flap normally folded within the envelope and adapted to unfolding therefrom, said flap when unfolded providing an opening in said end of the envelope for removal of material therefrom, said envelope containing a sheet of photographic film, the base layer thereof being attached to said rear wall, the light-sensitive surface thereof facing said aperture in the frontal wall, and said film occupying an area at least coextensive with the area of said light admitting aperture but less than the area of the envelope, whereby said unoccupied area of the envelope provides a cavity between the envelope walls, and a plurality of spacers mounted within said cavity for maintaining a predetermined separation of the walls enclosing said cavity, said envelope also containing a fluid releasably confined in a sac-like element fixedly mounted in the envelope at a position beside the exposable area of film, said sac-like element being responsive to compression for releasing said fluid to said film area after exposure thereof, said envelope further containing an opaque panel overlying said exposable film surface, the surface of said panel, facing said film, being adapted to formation of a positive print thereupon, said panel having a plurality of sprocket holes extending along at least a marginal portion thereof, said sprocket holes when engaged with the aforesaid sheet advancing mechanism enabling slidable displacement of the panel for exposure of the film surface and return of the panel to original position after said exposure, the aforementioned spacers likewise serving as limit stops for defining the limit of return movement of the panel, said assembly thereupon being adapted to compression for releasing and spreading said fluid, releasably bonding said film and panel, and forming said positive print.

14. A self-contained assembly of materials adapted to photographic exposure of a film embodied therein and to processing of said film and formation of a positive print of the subject image of said exposure upon one of the materials of said assembly through subjection of the assembly to compression, said assembly comprising, in combination, a rectangular envelope of preferably opaque paper material comprising a rear wall, a frontal wall comprising an aperture for admittance of actinic light and at least another aperture permitting the entrance of sheet advancing mechanism therewithin, each of said walls having a separable perforation formed therein adapted to receive a pin for releasably holding said envelope stationary, one end of said envelope comprising a flap normally folded within the envelope and adapted to unfolding therefrom, said flap when unfolded providing an opening in said end of the envelope for removal of material therefrom, said envelope containing a sheet of photographic film, the base layer thereof being attached to said rear wall, the light-sensitive surface thereof facing said aperture in the frontal wall, and said film occupying an area at least coextensive with the area of said light admitting aperture but less than the area of the envelope, whereby said unoccupied area of the envelope provides a cavity between the envelope walls, and a plurality of spacers mounted within said cavity for maintaining a predetermined separation of the walls enclosing said cavity, said envelope also containing a fluid releasably confined in a sac-like element fixedly mounted in the envelope at a position beside the exposable area of film, said sac-like element being responsive to compression for releasing said fluid to said film area after exposure thereof, the envelope further containing an opaque panel overlying said exposable film surface, the surface of said panel, facing said film, being adapted to formation of a positive photographic print thereupon, said panel having a plurality of sprocket holes extending along at least a marginal portion thereof, said sprocket holes when engaged with the aforesaid sheet advancing mechanism enabling slidable displacement of the panel for exposure of the film surface and return of the panel to original position after said exposure, the aforementioned spacers likewise serving as limit stops for defining the limit of return movement of the panel, the aforesaid envelope flap being normally folded over the leading edge of said panel and being caused to unfold outwardly by displacement of said panel, the flap also being adapted to maintain said outward position when the panel is retracted therefrom, whereat said flap may be engaged by propulsive mechanism, said flap thus comprising means for drawing the assembly between pressure applying surfaces whereby successive areas of said assembly may be compressed, the aforesaid compression providing release of the fluid from said container, spreading of said fluid between the exposed film and covering panel, releasable bonding of said film and panel, and formation of the positive print upon the aforesaid surface of the panel which faces the film, any portion of the fluid not retained between said film and panel entering and being retained within the aforementioned cavity of the envelope.

15. A photographic film pack comprising a plurality of individual assemblies releasably mounted in a casing, each of said assemblies comprising an envelope incorporating an exposure aperture for admitting actinic light, at least an aperture for admitting propulsive mechanism, and a pair of separable perforations comprising an opening through wall portions thereof, said envelope substantially enclosing materials comprising a light-sensitive film, an opaque, displaceable sheet interposed between said film and exposure aperture of the envelope, and a processing fluid contained for release between said film and opaque sheet, opposite walls of said casing likewise having perforations axially aligned with the aforesaid perforations in the envelopes and one of said casing walls likewise being formed for admitting actinic light and propulsive mechanism, said film pack also comprising a pin releasably inserted in the aforesaid perforations in the casing and envelopes, said pin being adapted to hold each envelope in the casing during withdrawal of said opaque layer therefrom, as by the aforesaid propulsive mechanism, and adapted to release each envelope from the casing during applications of withdrawing force directly to portions of the envelope, said pin coacting with said separable envelope perforations for the purpose.

ELMER E. GARRETT.
ROBERT C. STECK.
ALEXANDER T. YASENSKY.

No references cited.